(12) United States Patent
Krener-Iversen

(10) Patent No.: US 11,909,947 B2
(45) Date of Patent: Feb. 20, 2024

(54) DIRECTIONAL DISPLAY SYSTEM WITH EMBEDDED OBSERVER POSITION INFORMATION IN VIDEO FRAMES

(71) Applicant: Realfiction Lab ApS, København K (DK)

(72) Inventor: Steen Svendstorp Krener-Iversen, København K (DK)

(73) Assignee: Realfiction Lab ApS, København K (DK)

( * ) Notice: Subject to any disclaimer, the term of this patent is extended or adjusted under 35 U.S.C. 154(b) by 27 days.

(21) Appl. No.: 17/608,385

(22) PCT Filed: May 4, 2020

(86) PCT No.: PCT/EP2020/062317
§ 371 (c)(1),
(2) Date: Nov. 2, 2021

(87) PCT Pub. No.: WO2020/225211
PCT Pub. Date: Nov. 12, 2020

(65) Prior Publication Data
US 2022/0232199 A1    Jul. 21, 2022

(30) Foreign Application Priority Data
May 3, 2019  (EP) .................... 19172471

(51) Int. Cl.
*H04N 13/32* (2018.01)
*H04N 13/172* (2018.01)
(Continued)

(52) U.S. Cl.
CPC .......... *H04N 13/32* (2018.05); *H04N 13/172* (2018.05); *H04N 13/376* (2018.05); *H04N 13/383* (2018.05)

(58) Field of Classification Search
CPC .... H04N 13/172; H04N 13/32; H04N 13/376; H04N 13/383; H04N 13/398
(Continued)

(56) References Cited

U.S. PATENT DOCUMENTS

| 2006/0072830 A1* | 4/2006 | Nagarajan ............ G06V 30/412 |
| | | 375/E7.2 |
| 2016/0110919 A1* | 4/2016 | Hancock ................. G06T 19/20 |
| | | 345/428 |

(Continued)

FOREIGN PATENT DOCUMENTS

| EP | 0769881 A2 | 4/1997 |
| EP | 3021285 A2 | 5/2016 |

*Primary Examiner* — Behrooz M Senfi
(74) *Attorney, Agent, or Firm* — Joseph C. Zucchero; Carolyn S. Elmore; Elmore Patent Law Group, P.C.

(57) ABSTRACT

The present invention relates to a method for displaying an image in a direction towards an observer observing the image from a viewpoint. The method comprises providing a display system including a tracking system for tracking or detecting the position of the observer, a display screen having a plurality of image pixels for displaying the image, a controller for controlling the direction of light emitted from said display screen, and a processing unit for generating a buffer image from a data source. The method further comprises tracking the observer and generating tracking data to the processing unit, generating the buffer image and embedding the tracking data as embedded data in the buffer image, outputting the buffer image to the display screen and displaying the image on the display screen, and reading the embedded data by the controller and directing light from the display screen in a direction towards the viewpoint.

20 Claims, 2 Drawing Sheets

(51) Int. Cl.
*H04N 13/376* (2018.01)
*H04N 13/383* (2018.01)

(58) Field of Classification Search
USPC .......................................................... 348/51
See application file for complete search history.

(56) References Cited

U.S. PATENT DOCUMENTS

2020/0005543 A1* 1/2020 Kim .......................... G06T 7/73
2022/0155613 A1* 5/2022 Krener-Iversen .... H04N 13/366

* cited by examiner

DIRECTIONAL DISPLAY SYSTEM WITH EMBEDDED OBSERVER POSITION INFORMATION IN VIDEO FRAMES

BACKGROUND

Directional displays capable of emitting separate images or video streams in different observation angles have been around for many decades. A typical application of these are autostereoscopic or automultiscopic displays, which can for example convey a left eye perspective image to left eye(s) of one or more observer(s) and a right eye perspective image to right eye(s) of one or more observer(s).

Simple examples of such multiscopic displays are for example lenticular postcards, the type of postcards, which can convey an image experienced with stereoscopic depth, and lenticular posters which can show a short animation when an observer walks past one and hence observes it from varying angles.

An example of a more recent and sophisticated directional display is an electronic head tracking autostereoscopic or automultiscopic display. In such a display, the positions of eyes of observers may be detected, for example by a camera based head tracking system comprising face detection software for example comprising convolutional neural networks or Haar-feature classifiers. An image source may provide stereoscopically encoded images to the display, for example in the side-by-side or over-and-under stereoscopic formats where a left eye perspective image and a right eye perspective image is encoded are stitched together in one video frame which the display then separates into a left eye frame and a right eye frame. After stitching the images together, the resulting image is often resized back to the original size of a single image for compatibility with storage and transmission formats, which may result in a reduced resolution in the horizontal or vertical direction, which is generally a tolerated compromise to achieve the stereoscopic effect. The head tracking system may then provide information to the display about left eye positions and right eye positions of attending observers so the display can emit the left eye perspective image towards left eyes and the right eye perspective image towards right eyes. A controller in the display may calculate emission angles of individual areas of the image or of individual pixels corresponding to left eye and right eye positions. The display may be time multiplexed, so it emits the left eye perspective image towards left eyes and the right eye perspective image towards right eyes alternatingly. To avoid flicker and strobing artifacts, the frame rate experienced of each eye should not be too low. Generally, 60 fps experienced by each eye is regarded as the minimum for flicker free stereoscopic content, though there is some variation amongst individuals in the experience of flicker. This corresponds to a duty cycle of 120 cycles per second, comprising alternating left eye and right eye time slots. Such displays have been implemented by using an LCD display capable of a frame rate of 120 fps and a directional backlight unit capable of switching direction 120 times per second. The update of the display and the backlight may be matched, for example so they have essentially identical and synchronized rolling or global update.

Highly sophisticated systems have been demonstrated, where eye position information from the head tracking system is further being input to the image source and the image source repeatedly calculates perspective images corresponding to the eye positions and hence provides look-around capability, i.e. when an observer moves, the images provided to his left and right eyes are updated with corresponding perspective views, so he can move his head to see an object from a different angle and thereby have a very realistic experience of for example an object being in front of him, close to the experience of viewing a hologram. In a display of this configuration, more than two perspective views may be calculated, and it may not be optimal to stich the different perspective view images into a single image. Firstly, such a single image would either have to be very big to comprise the multiple images or the images would have to be downsized, reducing resolution. Further, tracking all eyes, calculating all perspective views and packing them into a single image, transmitting it to the display and then selecting and displaying individual perspective views and showing them in time slots of the duty cycle will introduce unnecessary latency from an eye positions is registered to the corresponding perspective view is shown to that eye, and if the observer is moving, the eye may have moved its position during the latency interval, resulting in reduced realism by lagging perspective update. If there is for example two observers, it requires four perspective views to be calculated and displayed, one perspective view per eye. With two observers and a per-eye experienced frame rate of 60 fps, a total of 240 frames per second will be displayed. The image source may for example be a computer with a graphics card comprising a GPU capable of rendering scenes in high quality at 240 fps. The display may be a 240 Hz LCD display with a pixel response times of 0.5 ms, hence capable of displaying 240 fps with low bleed between frames. The graphics card and the monitor may be capable of synchronizing so that each rendered frame is shown one and only one time, using a protocol like for example nVidia's G-Sync protocol. An LED or OLED directional backlight may be comprised, capable of switching direction 240 times per second.

The head tracking system may in a time slot transmit information about the position of an eye to both the image source and the display. The image source may then calculate a corresponding perspective view and transmit the image to the display and the display may from the eye position information calculate light emission directions for the directional backlight and control the backlight unit accordingly. The displayed perspective images need to be fairly precisely synchronized with the directions of light emitted from the backlight. A maximum allowance of slip in the synchronization may be for example 1% of a frame duration. In this interval where the direction of emitted light and the displayed image are out of sync, an eye may see an image intended for a different eye, resulting in essentially 1% crosstalk between images, which may be unnoticeable for most types of image content. With a duty cycle displaying 240 frames in total per second the maximum frame duration is $1/240$=app 4 ms. Hence, the maximum allowable slip in synchronization between displayed image and direction control may be around 1% of 4 ms=40 microseconds.

The problem is that in practical configurations it may be very difficult to maintain such a tight synchronization with a maximum slip of 40 microseconds. Commercially available high quality render software relevant for use in the image source is generally available for desktop operating systems such as Windows, Linux and MacOS which are not designed for such true time operation hence does not provide input/output with relevant time precision and the same applies to commercially available graphics cards. When a graphics card is locked to a monitor using for example nVidia's G-Sync protocol the latency from a rendering of an image is started to it is displayed is unknown and there is no feedback mechanism to the software application of when it is displayed. Setting a frame rate limiter in software may help establishing a more consistent latency, but even so output facilities in operating systems for control the display's light emission direction will generally be very difficult to establish with anything near a 40 ms maximum latency variation.

To summarize the problem: Using commercially available high quality render software for realtime rendering of the varying perspective views means limiting the choice of operating systems to operating systems that do not provide input/output procedures with high enough precision for controlling the direction of emitted light.

The objective of the disclosure is to overcome this problem and provide a display system, which detects observation points, such as observer's eyes, renders corresponding perspective views and displays the perspective views time multiplexed and precisely synchronized with simultaneous time multiplexed control of the direction of light from the display emitted towards corresponding observation positions, using an operating system which enables using commercially available, high quality render software for producing the perspective views.

SUMMARY OF THE DISCLOSURE

Figure 1:
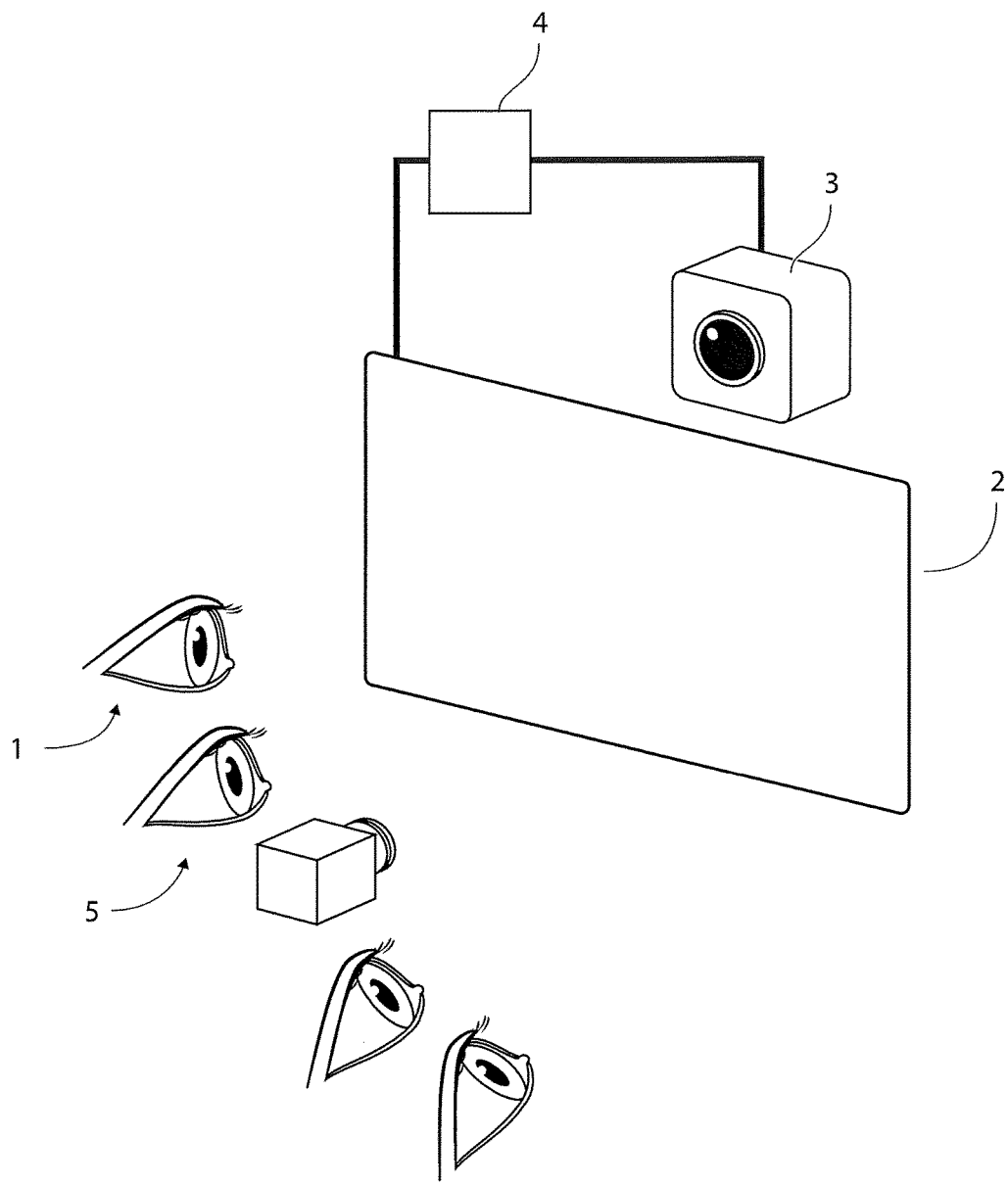
FIG. 1 shows a perspective view of a directional display system.

FIG. 1 shows a perspective view of an example of a configuration according to the present disclosure. A first observing object 1 is located essentially in front of a display 2. The first observing object 1 may be an eye of an observer or it may be a camera. An object detection system 3 may detect the position of the first observing object 1. The object detection system 3 may comprise a camera and it may comprise image feature detection software. The camera may be a stereo camera and it may be a visible or an infrared camera. The object detection system 3 may transmit information about the position of the first observing object 1 to an image render system 4. The object detection system may repeatedly detect positions of a plurality of observing objects and transmit the positions in a duty cycle, which may have a frequency of for example 120 cycles per second. The position of the first observing object 1 may be transmitted as spatial coordinates, for example as linear or polar coordinates. The image render system 4 may maintain a memory of the position of the first observing object 1 based on the received information from the object detection system 3. For example, it may maintain a table of a the positions of a plurality of observing objects. Alternatively, the object detection system 3 and the image render system 4 may be integrated and both systems may have access to a common memory or table of position(s).

The image render system 4 may calculate a perspective view image of a scene where the observation point of the view with respect to the scene corresponds to the position of the first observing object 1 with respect to the display 2.

The image render system 4 may further in the perspective view image include embedded information about the position of the first observing object 1. The embedded information may be in the form of an essentially invisible watermark or in a form that does not disturb the experience of the image or in a form so it can be removed from the image essentially without disturbing the experience of the image. For example, the embedded information may be encoded into pixel values in a first or last set of scan lines, which can later be masked out of the image essentially without disturbing the experience of the image. Alternatively, the image render system 4 may include the embedded information as metadata in an image file format or in an image transmission format. The image render system 4 may comprise a computer and may further comprise a graphics card with a GPU. The image render system 4 may transmit the perspective view image with embedded information to the display 4.

The display 2 may be a directional display capable of emitting a received perspective view image to a direction so it is observed by the first observing object 1 and so it is not observed by a second observing object 5. The display 2 may for example be an LCD display with a directional backlight. The directional backlight may for example be a display with a microlens array, as is well known in the art of head tracking autostereoscopic or automultiscopic displays. The display 2 may be capable of retrieving the embedded information from a received image and use the information to select a mode in which light is emitted towards the first observing object 1 and not towards the second observing object 2. For example, the retrieved embedded information may be used as index for a lookup table operation in a lookup table comprising observation point positions as inputs and display modes as outputs. The display 2 may be a display according to US patent application US20150365647A1 by Coming and Gargus, which is hereby incorporated in the description in its entirety by reference. Alternatively, the display 2 may be an automultiscopic display with 16 different "views" as they are sometimes called, i.e. capable of emitting towards 16 different zones, which are ranges of observation points. The position information retrieved from the image may be converted to a "view" number, for example it may be used as input to a lookup table, in which the output values are "view" numbers corresponding "views", where the output view is a zone comprising the observation point. Alternatively, the conversion to view number may be done before embedding the information, so the view number itself is embedded into the image.

The object detection system 3, the image render system 4 and the display 2 may be operated in a time multiplexed operation, where in a first time slot the object detection system 3 detects a first object, the image render system 4 renders an image corresponding to the position of the first object, the display 2 displays image corresponding to the first object and in a second time slot the object detection system 3 detects a second object, the image render system 4 renders an image corresponding to the position of the second object, the display 2 displays image corresponding to the second object and so on for a plurality of two or more objects. The time multiplexing may have a duty cycle so each perspective image is displayed a number of times per second, which is high enough for an observer not to be disturbed by flicker or strobing, for example 60 times per second, i.e. the duty cycle may for example comprise n×60 time slots per cycle, where n is the number of perspective images (=the number of observing objects) and 60 is the desired number of frames per second experienced by an observing object. Alternatively, it may be higher than n×60 for higher perceived frame rates. For example, for large display with a content comprising fast moving objects, a higher frame rate may be desirable, or where one or more observing objects is a camera, a higher frame rate may be desirable, in the latter case to reduce interference patterns caused by the observing cameras frame rate. The display 2 may be selected so it can show n×60 frames per second with a bleed between images small enough to not cause disturbing ghosting. For example, if n=4 and hence n×60=240, the display may be selected so it supports a frame rate of 240 fps and a pixel response time of 0.5 ms. The display 2 may comprise a directional backlight and the display 2 and directional backlight may have synchronized update patterns, which may be for example a global pixel update or a rolling scanline update.

The image render system 4 and the display 2 may be synchronized so a rendered frame is shown essentially always one time and only time, for example using the nVidia G-Sync protocol. Additionally, a graphics card for the image render system 4 may be selected so it is fast enough to render the scene n×60 times per second for at least a minimum percentage of frames, for example for 99.8% of rendered frames. Additionally, a maximum frame rate capping may be set on the graphics card or in the render software. This may ensure that the graphics card does not output frames faster than the display can receive and display them.

The advantage of transmitting the information about observation position corresponding to an image as embedded information in the image itself is that this can ensure a high degree of time synchronization between displayed image and the direction the image is displayed in, in a time multiplexed system. Synchronisation of image and directional information is essential to avoid ghosting, as described above in the background section, and using embedded directional information in the image itself varying degrees of latency in the render-to-display pipeline and input/output pipelines of an operating system will not influence synchronization.

In a configuration of the disclosure, the image render system 4 may embed only a direction towards an observing object from a point which is fixed with reference to the display 2, for example with reference to the top center of the display. In this configuration, the display 2 may include a sensor for sensing the distance to an observing object in the direction towards an observing object and it may then calculate the position of the observing object in all three dimensions. The advantage of this configuration is that some directional displays may already include such a sensor and the amount of information to be embedded in the image is reduced.

Figure 2:
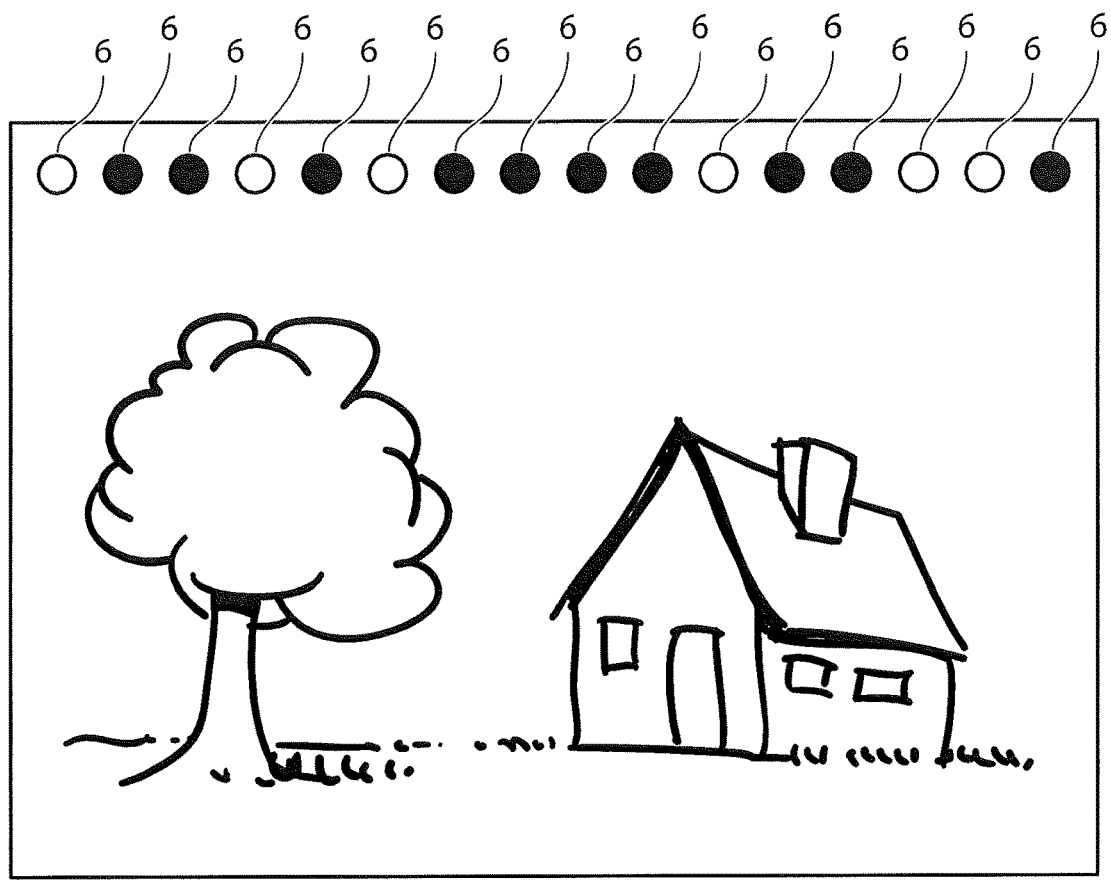
FIG. 2 shows an example of an image with embedded information.

FIG. 2 shows an example of an image with embedded information. In this example, information about the position of an observing object is encoded as a plurality 6 of clusters of pixels 1-16 in the top ten scan lines of a display, where each cluster 1-16 represents a bit of a 16-bit word position information which may be looked up in a pre-defined table of positions in the display. Hence, 2^16 positions may be selected and they may be stored in a table in the display 2 and in a table in either the object detection system 3 or the image rendering system 4. A closest entry in the table to a detected position may be determined and the corresponding 16-bit word found and embedded. In the display, the 16-bit word may reversely be used to find a corresponding position in the table. The table in the display 2 may be a reverse table of the table used for embedding the 16-bit word.

The embedded 16-bit word may be retrieved electronically by sampling pixels in the clusters corresponding to the 16 bits. The image may be cropped electronically before it is displayed so the clusters are removed and do not disturb the experience of the image, or it may be mechanically cropped with a physical mask to achieve essentially the same result. Alternatively, the 16-bit word may be retrieved optically from the image, for example using photodiodes located closely to the screen. The photodiodes may be connected to electrical comparators, which may output a high or low voltage depending on if the cluster of pixels are below or above a brightness threshold and hence providing the 16-bit word in binary electrical form. The photodiodes may be mounted on an elongated bar, which simultaneously acts as a mechanical mask for cropping the image so the 16 pixel clusters are not visible. The elongated bar may have a clip on the backside so it can be attached to a display by clicking it on. The elongated bar may comprise a printed circuit board that may comprise the comparators and may further comprise additional circuitry, for example a microprocessor, for performing the above described lookup operation and/or interfacing to a controller of the emission direction of the display 2, for example a controller for a directional backlight, which may already be included in a commercially available automultiscopic display.

The advantage of this configuration is that an existing commercially available automultiscopic display, can be easily modified to operate with embedded position information in the received video frames as in the above described configurations.

Figure 3:
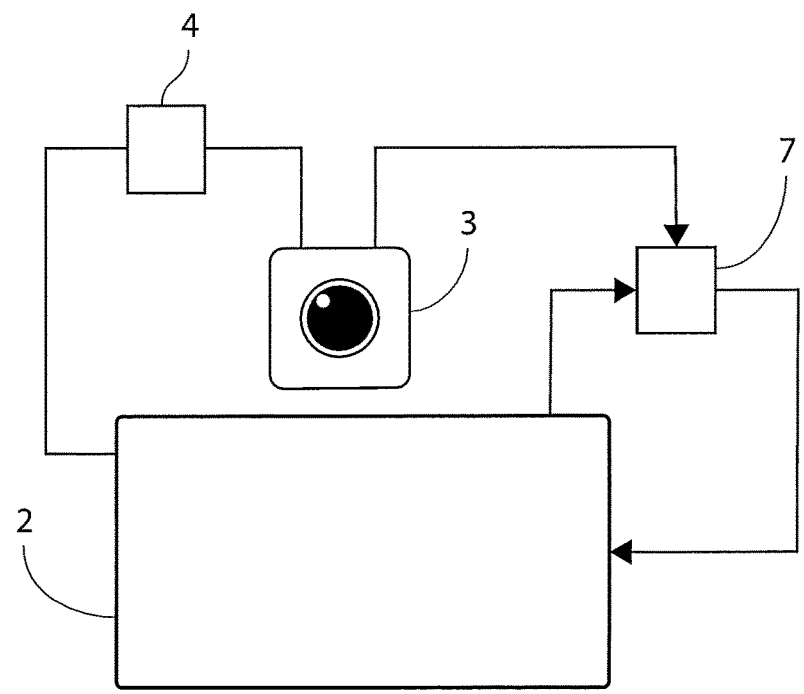
FIG. 3 shows an alternative configuration of a directional display system.

FIG. 3 shows an alternative configuration of the disclosure, where the embedded information comprises references to the memory 7 and the display 2 may obtain data from the memory 7 and use this data for determining a direction of emitted light. The object detection system 3 may update the content of the memory 7, while an image frame is being displayed and the display 2 may obtain retrieved data from the memory 7, while an image frame is being displayed and may adjust the direction of emitted light according to said retrieved data, while an image frame is being displayed. For example, the object detection system may update the content of the memory 7 at a higher frequency than a frame rate of the image render system 4 and the display 2 may retrieve data from the memory 7 at a higher frequency than a frame rate of the display 2. An advantage of this configuration is that distracting observed variations in illumination intensity when the observer 1 is moving at a fast speed relative to the display 2 can be reduced or eliminated without increasing the frame rate.

The invention claimed is:

1. A method for displaying a first image in a first direction towards a first observer and displaying a second image in a second direction towards a second observer by means of a time multiplexed display system, said first observer observing said image from a first viewpoint in front of said time multiplexed display system and said second observer observing said image from a second viewpoint in front of said time multiplexed display system, said method comprising:

providing said time multiplexed display system including:
a tracking system for tracking or detecting the position of said first observer or a part of said first observer such as an eye of said observer and for tracking or detecting the position of said second observer or a part of said second observer,
a display screen having a plurality of image pixels for displaying said image,
a controller for controlling the direction of light emitted from said display screen such that said first image being visible from said first viewpoint and said second image being visible from said second viewpoint, a processing unit for sequentially generating a first buffer image and a second buffer image from a data source comprising image data for said first image and said second image, said method comprising:

providing said data source, tracking said first observer by means of said tracking system and generating tracking data to said processing unit, generating said first buffer image and embedding said tracking data as embedded data in a number of don't care pixels in said first buffer image by means of said processing unit, outputting said first buffer image to said display screen and displaying said first image by means of said display screen, and reading said embedded data by said controller and directing light from said display screen in a direction towards said first viewpoint, tracking said second observer by means of said tracking system and generating tracking data to said processing unit, generating said second buffer image and embedding said tracking data as embedded data in a number of don't care pixels in said second buffer image by means of said processing unit, outputting said second buffer image to said display screen and displaying said second image by means of said display screen, and reading said embedded data by said controller and directing light from said display screen in a direction towards said second viewpoint.

2. A method for displaying a first image in a first direction towards a first observer and displaying a second image in a second direction towards a second observer by means of a time multiplexed display system, said first observer observing said first image from a first viewpoint in front of said time multiplexed display system and said second observer observing said second image from a second viewpoint in front of said time multiplexed display system, said method comprising:

providing said time multiplexed display system including:

a tracking system for tracking or detecting the position of said first observer or a part of said first observer such as an eye, and for tracking or detecting the position of said second observer or a part of said second observer, a display screen having a plurality of image pixels for displaying said first image and said second image, said display screen configured for displaying said first image and said second image at a frame rate, a controller for controlling the direction of light emitted from said display screen such that said first image being visible from said first viewpoint, and said second image being visible from said second viewpoint, a first memory for storing tracking data, said method comprising:

tracking said first observer by means of said tracking system and writing tracking data into said memory at a position of a number of don't care pixels, displaying said first image by means of said display screen, said controller reading said tracking data from said memory while said first image being displayed, and directing light from said display screen in a direction towards said first viewpoint, such that said first image being visible by said first observer when said first observer changing said viewpoint while said first image being displayed, and tracking said second observer by means of said tracking system and writing tracking data into said memory at a position of a number of don't care pixels, displaying said second image by means of said display screen, said controller reading said tracking data from said memory while said second image being displayed, and directing light from said display screen in a direction towards said second viewpoint, such that said second image being visible by said second observer when said second observer changing said viewpoint while said second image being displayed.

3. The method according to claim 2, said display system including a processing unit for generating a first buffer image from a data source comprising image data for said first image and for generating a second buffer image from a data source comprising image data for said second image.

4. The method according to claim 3, comprising:

providing said data source, generating said first buffer image and said second buffer image by means of said processing unit, and generating a pointer to said first memory, and embedding said pointer as embedded data in said first buffer image and said second buffer image by means of said processing unit.

5. The method according to claim 3, comprising:

outputting said first buffer image and said second buffer image to said display screen, and reading said embedded data by said controller such that said controller being pointed to read from said first memory.

6. The method according to claim 1, said embedding comprising substituting image data with said pointer in said first buffer image and said second buffer image such that a number of pixels comprise said pointer data instead of pixel data.

7. The method according to claim 1, said display system including a second memory for storing tracking data.

8. The method according to claim 7, comprising:

writing tracking data of said second observer into said second memory.

9. The method according to claim 8, comprising:

reading said embedded data by said controller such that said controller being pointed to read from said first memory while said image being displayed to said first observer or said second memory while said image being displayed to said second observer.

10. The method according to claim 1, said first viewpoint corresponding to an observation angle defined as an angle between the line of sight between an eye of said first observer and a point at said display screen.

11. The method according to claim 2, said image being displayed in a time window corresponding to the inverse of said frame rate.

12. The method according to claim 1, said processing unit being a graphical processing unit.

13. The method according to claim 10, said display system including a plurality of subpixels or a backlight for directing light from said display screen in a direction towards said first viewpoint.

14. The method according to claim 2, said embedding comprising substituting image data with said pointer in said first buffer image and said second buffer image such that a number of pixels comprise said pointer data instead of pixel data.

15. The method according to claim 2, said display system including a second memory for storing tracking data.

16. The method according to claim 15, comprising:
    writing tracking data of said second observer into said second memory.

17. The method according to claim 16, comprising:
    reading said embedded data by said controller such that said controller being pointed to read from said first memory while said image being displayed to said first observer or said second memory while said image being displayed to said second observer.

18. The method according to claim 2, said first viewpoint corresponding to an observation angle defined as an angle between the line of sight between an eye of said first observer and a point at said display screen.

19. The method according to claim 3, said processing unit being a graphical processing unit.

20. The method according to claim 18, said display system including a plurality of subpixels or a backlight for directing light from said display screen in a direction towards said first viewpoint.

\* \* \* \* \*